(12) United States Patent
Sanger

(10) Patent No.: US 7,660,013 B2
(45) Date of Patent: Feb. 9, 2010

(54) METHOD OF CONVERTING A COLOR RECIPE

(75) Inventor: Kurt M. Sanger, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 637 days.

(21) Appl. No.: 11/035,304

(22) Filed: Jan. 13, 2005

(65) Prior Publication Data
US 2006/0152744 A1 Jul. 13, 2006

(51) Int. Cl.
*G06F 15/00* (2006.01)
(52) U.S. Cl. .................. 358/1.9; 358/504; 358/518; 345/593; 345/600; 345/604; 382/167
(58) Field of Classification Search ............. 358/1.9
See application file for complete search history.

(56) References Cited

U.S. PATENT DOCUMENTS

| | | | |
|---|---|---|---|
| 4,275,413 | A | 6/1981 | Sakamoto et al. |
| 5,087,126 | A | 2/1992 | Pochieh |
| 5,528,386 | A | 6/1996 | Rolleston et al. |
| 5,745,120 | A * | 4/1998 | De Baer et al. ............. 345/590 |
| 5,870,530 | A | 2/1999 | Balasubramanian |
| 5,892,891 | A | 4/1999 | Dalal et al. |
| 6,324,975 | B1 * | 12/2001 | Kondo .................. 101/171 |
| 6,362,808 | B1 * | 3/2002 | Edge et al. .................. 345/601 |
| 2003/0021470 | A1 * | 1/2003 | Kakutani .................. 382/162 |
| 2003/0098986 | A1 | 5/2003 | Pop |
| 2003/0184772 | A1 * | 10/2003 | Agarwal .................. 358/1.9 |
| 2004/0021882 | A1 * | 2/2004 | Kakutani .................. 358/1.9 |
| 2004/0190022 | A1 * | 9/2004 | Kiyohara .................. 358/1.9 |
| 2004/0223173 | A1 * | 11/2004 | Arai .................. 358/1.9 |
| 2006/0012809 | A1 * | 1/2006 | Shimada .................. 358/1.9 |
| 2006/0039602 | A1 * | 2/2006 | Isakharov .................. 382/162 |
| 2006/0119870 | A1 * | 6/2006 | Ho et al. .................. 358/1.9 |
| 2006/0285742 | A1 * | 12/2006 | Arai et al. .................. 382/162 |

FOREIGN PATENT DOCUMENTS

| | | |
|---|---|---|
| EP | 615379 A1 * | 9/1994 |
| EP | 1 229 732 | 8/2002 |
| EP | 1341370 A2 * | 9/2003 |

OTHER PUBLICATIONS

Rautenberg, S. et al, "The use of fuzzy sets for color recipe specification in the textile print shop" Fuzzy Systems Proceedings, 1998. IEEE World Congress on Computational Intelligence., vol. 2, May 4-9, 1998 pp. 885-890.*

Mizutani, E. et al, "Evolving color recipes" Systems, Man and Cybernetics, Part C, IEEE Transactions on, vol. 30, Issue 4, Nov. 2000 pp. 537-550.*

"Applied Regression Analysis", third edition, edited by N. Draper and H. Smith; 1998.

N. Draper and H. Smith; Regression in Matrix Terms: Straight Line Case; from Applied Regression Analysis, Third Edition, 1998.

\* cited by examiner

*Primary Examiner*—Mark K Zimmerman
*Assistant Examiner*—Javier J Ramos
(74) *Attorney, Agent, or Firm*—Nelson A. Blish

(57) ABSTRACT

A first recipe (10) is converted using a first colorant set to a second recipe (50) using a second colorant set. The first recipe (10) is converted into a CIE_Lab estimate (30) using a first model and a first database (20). The CIE_Lab estimate (30) is converted into the second recipe (50) using a second model and second database (40).

20 Claims, 12 Drawing Sheets

METHOD OF CONVERTING A COLOR RECIPE

FIELD OF THE INVENTION

The present invention relates in general to digital printing wherein a color is created by combining percentages of multiple primary colorants and in particular to printing multiple color recipes and a method to rate each recipe to select the best.

BACKGROUND OF THE INVENTION

Digital Halftone Color Proofers use cyan, magenta, yellow, and black (CMYK) colorants to image halftone bitmap separations and render halftone proofs. An example of such a proofer is the Kodak Approval Digital Color Proofing System. This system also allows recipe colors to be generated Using different amounts of each of the primary colors. This system also has specialty donors such as orange, green, blue, white, and metallic, which may each be used as a component of a recipe color. For such a system customers need a method to convert a color request, in terms of a color coordinate system such as CIE_Lab (Commission Internationale de l'Éclairage L*a*b*), into a recipe.

The digital proofing system may have different versions of colorants. For example, there may be more than one type of cyan, magenta, yellow, and black; to emulate different ink sets. When new donor sets become available customers need to easily convert recipes from one donor set to another.

Other color printing systems, paint mixing systems, and ink blending, have the same problem in determining how to render a requested color from numerous available primary colorants. When new primary colorants are introduced there is a need to convert existing recipes of old primary colorants into a compatible recipe with the new colorants.

U.S. Pat. No. 5,087,126 (Pochieh) discloses a method for estimating a color, which includes interpolating between measured points to create additional triangular points to be used. Pochieh does not estimate points that are outside the measured space. Instead he teaches moving the requested color inside the space. Pochieh's method reduces the number of points that must be stored, and is capable of running at high speed.

U.S. Pat. No. 5,870,530 (Balasubramanian) discloses a method of selecting an extra colorant based on a nonlinear function in reflectance. Balasubramanian teaches how to convert a cyan, magenta, and yellow (CMY), input to cyan, magenta, yellow, orange, green, and blue (CMYOGB), with an increase in the OGB levels out such that the increased color saturation of the secondary colors is utilized to increase the saturation in the output image. Balasubramanian teaches how to expand the output color gamut, and does not teach how to faithfully reproduce a requested color.

U.S. Pat. No. 4,275,413 (Sakamoto et al.) discloses estimating color by performing linear interpolation on a tetrahedral collection of data points that surround the requested color. This method uses the minimum amount of data points to estimate the color resulting in the least amount of work.

U.S. Pat. No. 5,528,386 (Rolleston et al.) discloses a method to produce a linear color output in cyan, magenta, yellow, and black (CMYK), from an input signal consisting of red, green, and blue (RGB). Rolleston teaches a method of determining how much black to use to perform under color removal, along with an adjustment of the remaining CMY components to produce the desired color.

U.S. Pat. No. 5,892,891 (Datal et al.) discloses a system that uses four colorants to obtain any desired color. Datal et al. teach comparing the requested color to a primary donor set consisting of CMY to an extended donor set to determine if the requested color is out of the CMY color gamut. Datal et al. does not teach dividing the CMY color space into pages consisting of three color combinations with black. Datal et al. does not teach how to add black to the CMY set. Datal et al. teaches that the primary color set must contain three colors substantially situated about the origin of the color space, and comparing this color gamut to the gamut of a color set that contains the extended color. Datal et al. discloses creating an output data set by eliminating the color opposite to the extended color. Eliminating the opposite color was used in the graphic arts for high-fi color where the cyan screen angle was used for orange, and the magenta screen angle was being used for green.

Existing algorithms to convert a color specified using red, green, and blue (RGB) components into a cyan, magenta, and yellow (CMY) usually perform a tri-linear approximation based on the three closest points. Using the minimum of three points increases the speed of the calculation allowing it to be accomplished in-line while the CMY colorants are being printed. Lookup tables are used to return the three CMY points given an RGB input.

In converting from RGB to CMYK one needs to select how to determine the black level. One must also select a method for estimating the black level when converting from a colorant independent space such as CIE_Lab. Converting from a first CMYK colorant to a second CMYK colorant has a similar problem. Two popular methods for selecting the black level are under color removal (CCR), and gray component replacement (GCR). GCR is equivalent to selecting the maximum amount of black. Additional methods such as U.S. Pat. No. 5,528,386 may select the minimum amount of black. None of these methods teach to eliminate one of the CMYK output colorants.

SUMMARY OF THE INVENTION

Briefly, according to one aspect of the present invention a first recipe is converted using a first colorant set to a second recipe using a second colorant set. The first recipe is converted into a CIE_Lab estimate using a first model and a first database. The CIE_Lab estimate is converted into the second recipe using a second model and second database.

An advantage of the present invention is to reduce the number of primary colorants used because each colorant in the output color requires additional material, additional time to load, additional time to image, and additional time to unload the colorant. Reducing the output colors to three components eliminates the problem of how to estimate the black level as its one of the three possible color components.

The present invention discloses how to select the best three colorants to reproduce the desired color. This includes testing color combinations of CMK, CYK, MYK, MOK, YOK, YGK, CGK, CBK, and MBK. The present invention rates each solution by how far off the page the desired color is, the accuracy of the model used, and the accuracy of the reproduction system.

It is an advantage of the present invention that an accurate prediction of color estimate is provided. This allows selection of a method that is the best solution. It also allows determination of additional data points, or finer resolution, to obtain a better estimate. A further advantage is that we may rate different solutions and provide multiple choices for how we obtain the requested color.

It is an advantage of present invention that solutions using different primary colorants are presented and rated. This allows selection of a solution using primary colorants that are in stock. Alternatively a primary colorant that not previously considered may be selected in order to perform a closer match to the requested color.

It is an advantage of the present invention that special colorants are not introduced in the output recipe unless special colorants were used in the original recipe.

DETAILED DESCRIPTION OF THE INVENTION

Figure 1:
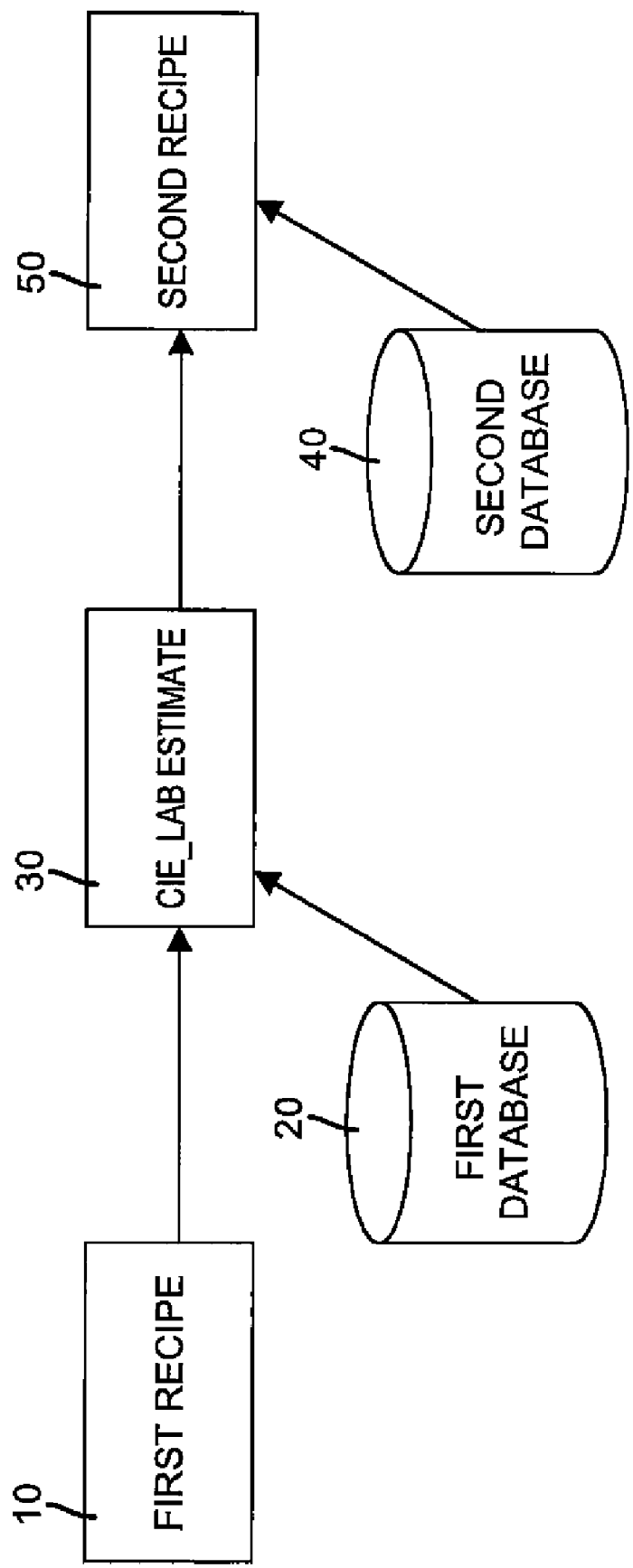
FIG. 1 is a block diagram showing an overview of the invention.

In the present invention at least two databases must be created. Referring to FIG. 1, the first database 20 uses the first colorant set. The first database 20 is used to estimate the color (CIE_Lab estimate) 30 of a first recipe 10 using the first colorant set. The second database 40 uses a second colorant set. This is the colorant set for the new second recipe 50. The second database 40 is used with the CIE_Lab estimate 30 from the first database 20 to create the new second recipe 50.

To create a first database 20 of output color as a function of specified colorant input levels color patches composed of combinations of different amounts of different colorants are printed. Measure the color patches with an instrument capable of recording CIE_Lab with a D50 Illuminant and 2 degree observer. Such an instrument is a Gretagmacbeth Spectroscan/Spectrolino. An example uses a Kodak Approval Digital Color Proofing System to image Cyan DC02, Magenta DM02, and Black DK02 donors. Patches are imaged using nine cyan density clicks from D-49 in steps of 10, nine magenta density clicks from D-52 in steps of 10, and black density clicks of {−61, −52, −42, −32, −20, −8, 6, and 30}. On the Kodak Approval Digital Color Proofing System a Cyan DC02 density click is converted to Status T Density by the formula Density Click*0.025 +1.17+Cyan Density of Paper. Magenta DM02 Status T Density is equal to the Density Click*0.025+1.25+Magenta Density of Paper. Black DK02 Status T Density is equal to Density Click*0.025+1.46+Visual Density of Paper. Each color patch was measured with the Gretagmacbeth Spectrolino recording the CIE_Lab values. The data is placed in a comma separated values file with each line consisting of one entry. Each line also contains the density click settings for the three color components. The data is organized by black, then cyan, then magenta with magenta changing the fastest and black changing the slowest.

The second database 40 of output color as a function of specified colorant input levels is also created by printing color patches composed of combinations of different amounts of different colorants. The color patches are measured with an instrument capable of recording CIE_Lab with a D50 Illuminant and 2 degree observer. Such an instrument is a Gretagmacbeth Spectroscan/Spectrolino. For example, a Kodak Approval Digital Color Proofing System is used to image Cyan DC03, Magenta DM03, and Black DK03 donors. Patches are printed using nine cyan density clicks from D-49 in steps of 10, nine magenta density clicks from D-52 in steps of 10, and black density clicks of {−61, −52, −42, −32, −20, −8, 6, and 30}. On the Kodak Approval Digital Color Proofing System a Cyan DC02 density click is converted to Status T Density by the formula Density Click*0.025+1.17+Cyan Density of Paper. Magenta DM02 Status T Density is equal to the Density Click*0.025+1.25+Magenta Density of Paper. Black DK02 Status T Density is equal to Density Click*0.025+1.46+Visual Density of Paper. Each color patch was measured with the Gretagmacbeth Spectrolino recording the CIE_Lab values. The data is placed in a comma separated values file with each line consisting of one entry. Each line also contains the density click settings for the three color components. The data is organized by black, then cyan, then magenta with magenta changing the fastest and black changing the slowest.

Figure 2:
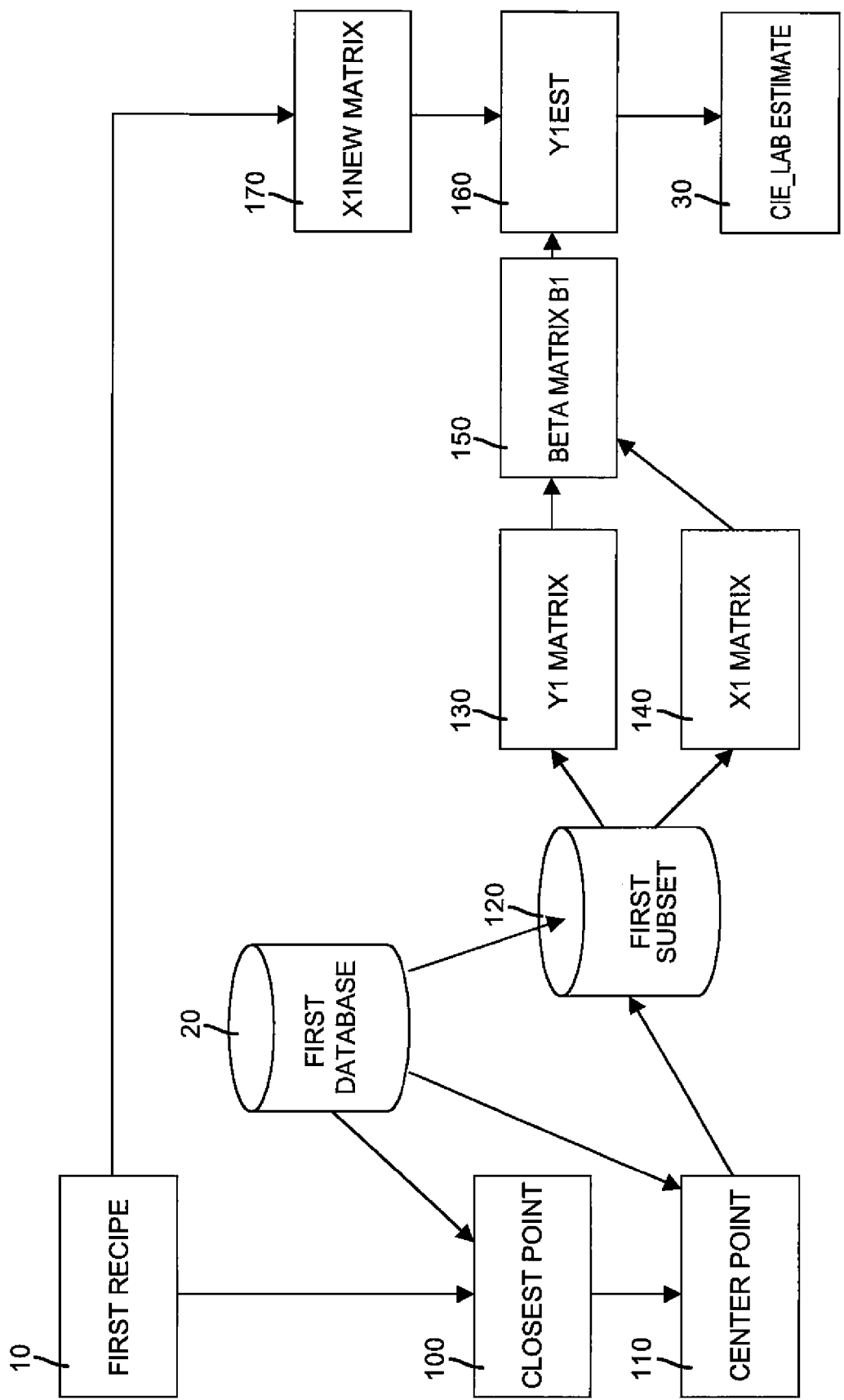
FIG. 2 is a block diagram detailing the method of calculating the CIE_Lab estimate from a first recipe.

This example requires the user to enter a first recipe 10 in terms of cyan density clicks, magenta density clicks, and black density clicks. The first model created estimates the CIE_Lab estimate 30 given a recipe by modeling CIE_Lab as a function of colorant levels using the first database 20. Create this model using a subset of data points close to the first recipe 10 as shown in FIG. 2. To find the closest data point 100, for each data point in the first data set 20 compute the sum of the colorant differences squared. SumColorDiffSq={(colorant1−colorant1(entry))$^2$+(colorant2−colorant2(entry))$^2$+(colorant3−colorant3(entry))$^2$}. Where colorant1 is the black density click setting, colorant2 is the cyan density click setting, colorant3 is the magenta density click setting, colorant1(entry) is the black density click value for the current entry in the data base, colorant2(entry) is the cyan density click value for the current entry in the data base, and colorant3(entry) is the magenta density click value for the current entry in the data base. The closest data point 100 is the data point with the minimum SumColorDiffSq.

Next, find the center 110 of the 3×3×3 array of data that will be the first subset 120 of data points to model. Once the coordinates of the closest point 100 are obtained, use these coordinates as the center point 110 of the data points about the color request. If the closest point 100 is on the edge of the database, then modify the center point 110 to use points just inside the surface. Do this by testing the coordinates against the indexes. Given each colorant, find the maximum number of indexes used in the first data set. If the coordinate of the closest point 100 is equal to the first index for this color, then set the coordinate of the center point 110 to the second index. Else if the coordinate for the closest point 100 is equal to the last index for this color, then set the coordinate of the center point 110 to the last index minus one. Repeat these steps for each color in the first data set to obtain the center point 110 of the points to be modeled.

In the example, 8 black levels are in the first data set. If the black index for the closest point is 1, then set the black index for the center of points to be modeled to 2. If the black index for the closest point was 8, then set the black index for the center of points to be modeled to 7. Otherwise use the black index for the closest point as the black index for the center of points to be modeled.

The center point 110 is used to collect the data from the first database 20 to fill the first subset 120. The indexes for the first subset 120 will be −1, 0, and +1 about the center point 110 for each color, creating a 3×3×3 array of data points.

Next, create a Y1 matrix 130 of measured color from the first subset 120 of data points. The output values from this second model will be CIE_Lab estimate for a given set of colorant settings. The Y1 matrix 130 will have one column of 27 CIE_L* values, one column of 27 CIE_a* values, and one column of 27 CIE_b* values making it a 27 by 3 matrix.

Next, create an X1 matrix 140 of colorant settings from the subset 120 of data points. The X1 matrix 140 contains one column for each factor to be used in the first model. As a minimum model the output color as a function of colorant1, colorant2, and colorant3. This description adds columns to the X1 matrix for colorant1$^2$, colorant2$^2$, colorant3$^2$, colorant1×colorant2, colorant2×colorant3, colorant3×colorant1, and a column of ones. This creates an X1 matrix 140 that is 27 rows by 10 columns. Each row corresponds to an entry for one of the 27 rows of the subset of data points centered about the points to be modeled. The modeling process will create slopes for each factor.

Next compute a first Beta matrix (B1) 150=(X1' inv(X1)) X1'Y1 where X1 is the X1 matrix 140, X1' is the transpose of the X1 matrix 140, inv(X1) is the inverse of the X1 matrix 140, and Y1 is the Y1 matrix 130. The B1 matrix 150 will be 10 by 3.

Use the Beta matrix (B1) 150 to estimate a Y1est 160 by multiplying a new Y1new matrix 170 by the Beta matrix B1 150. (Y1est=Y1new B1) where Y1new matrix 170 is a 1 by 10 matrix composed of {colorant1, colorant2, colorant3, colorant1$^2$, colorant2$^2$, colorant3$^2$, colorant1×colorant2, colorant2×colorant3, colorant3×colorant1, and 1}. Y1est 160 will be a 1 by 3 matrix consisting of {CIE_L*Estimate, CIE_a*Estimate, and CIE_b*Estimate}.

For example Y1new 170 is a matrix composed of a {colorant1=black, colorant2=cyan, and colorant3=magenta} first recipe 10. Y1est 160 is the color of the CIE_Lab estimate 30 for the first recipe 10 using the first database 20.

Figure 3:
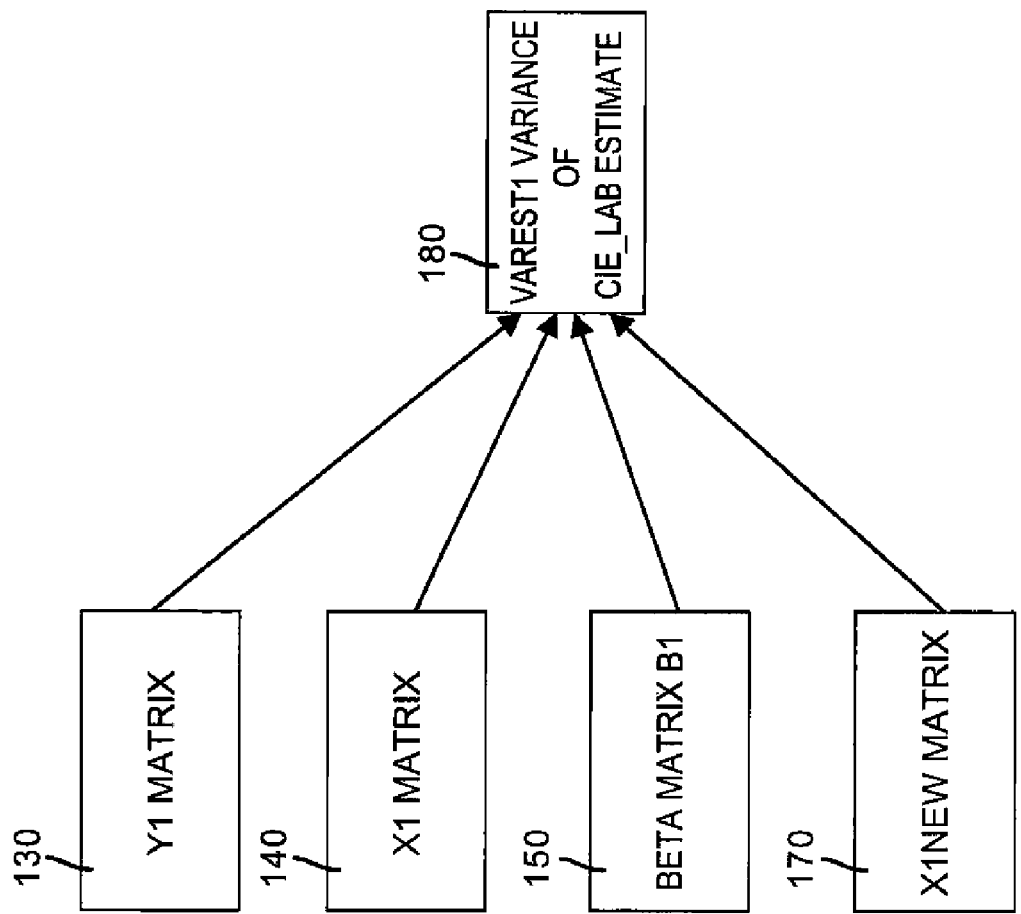
FIG. 3 is a block diagram showing the calculation of the variance of the CIE_Lab estimate from the first recipe using a first database.

The accuracy of Y1est 160 may be estimated by computing the variance of the estimate as defined by Draper and Smith, "Applied Regression Analysis", third edition, edited by Norman R. Draper and Harry Smith, 1998. Referring to FIG. 3, the variance of the estimate (VarEst1 180) may be computed using VarEst1=X1new (X1' inv(X1) X1new' MSE1, where X1new 170 is the X matrix composed of the first recipe 10, X1new' is the transpose of X1new, X1 is the X1 matrix 140 of input colorant settings, X1' is the transpose of the X1 matrix, inv(X1) is the inverse of the X1 matrix, and MSE1$^2$ is the variance of the mean squared error.

Note that Y1new (X1' inv(X1)) Y1new' will be a 1×1 solution. MSE1$^2$ will be a 3×3 matrix. The terms of interest are in are on the diagonal of the MSE1$^2$ matrix, and they correspond to the variance of the modeled colorants. Set VarEst1=X1new (X1' inv(X1))X1new' {MSE1$^2$(1,1), MSE1$^2$(2,2), MSE1$^2$(3,3)}.

Compute MSE1$^2$ using MSE1$^2$=(Y1'Y1−B1'X1'Y1)/dFResidual1 where the a Y1 matrix 130 consists of the measured output CIE_Lab from the first subset 120 of data points, Y1' is the transpose of the Y1 matrix 130, B1 is the Beta matrix B1 150, B1' is the transpose of the Beta matrix B1 150, and dFResidual1 is the degrees of freedom in the residual computed as the total degrees of freedom used to compute the Beta matrix minus the degrees of freedom used in the model. For example, 27 entries give 27 total degrees of freedom. Ten slopes are estimated in the model so 10 degrees of freedom are used to build the model leaving 17 degrees of freedom in the residuals. (dFResidual1=17).

This first model produces CIE_Lab estimates. So the variance of the first estimate (VarEst1 180) is in terms of CIE_Lab levels. The square root of the variance is similar to the color error in terms of Delta E.

Figure 4:
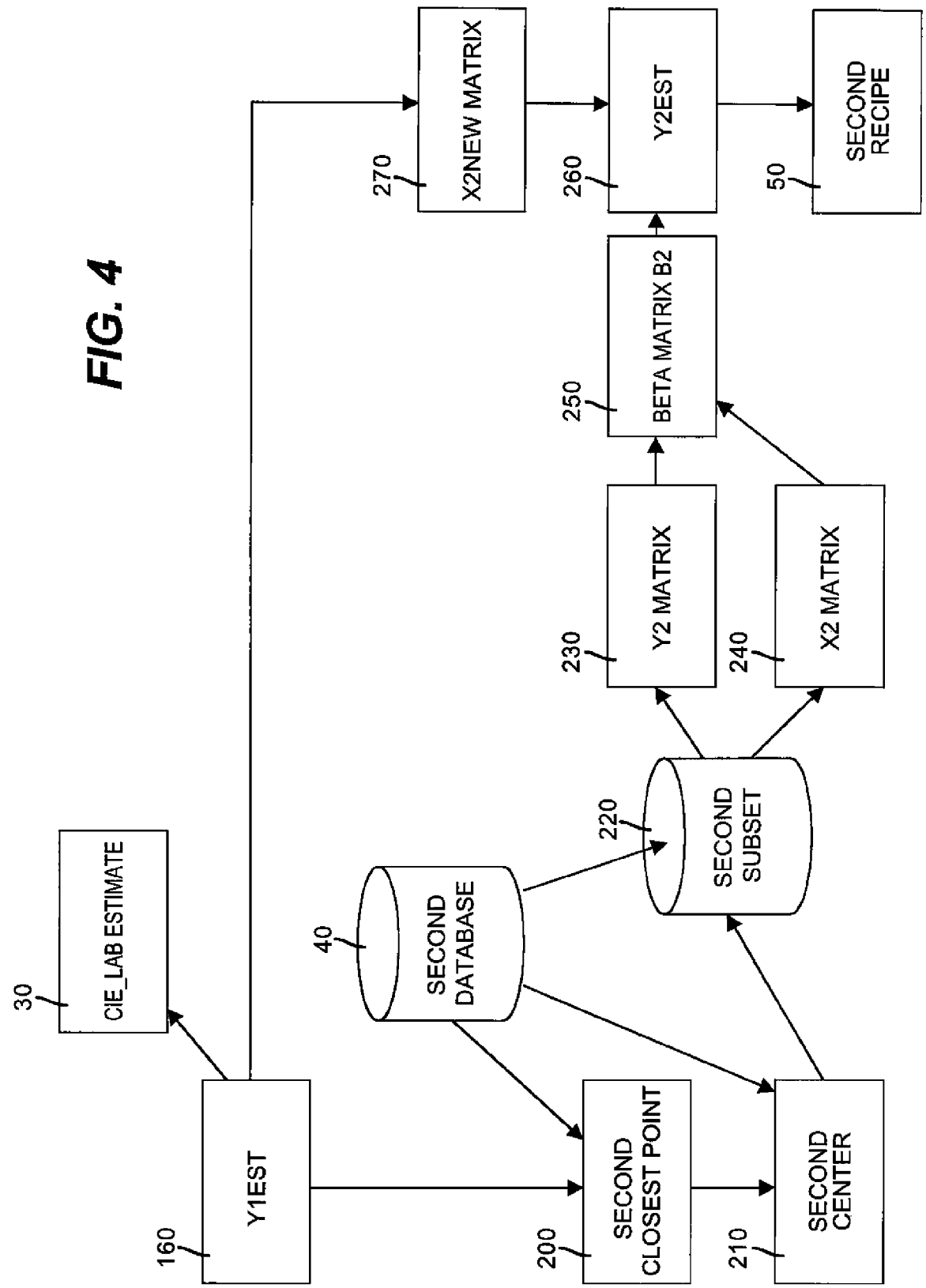
FIG. 4 is a block diagram detailing the method of calculating a second recipe from the CIE_Lab estimate and a second database.

The CIE_Lab estimate 30 (Yest1 160), for the first recipe 10 with the first database 20 is converted into a second recipe 50 using the second donor database 40. Referring to FIG. 4, compute the difference between the CIE_Estimate 30 (Yest1 160) and each entry in the second database 40 using the Delta E, which is equal to the square root of the sum of the squares of the differences in each component. DeltaE(entry)=square root of {(Yest1(CIE_L*)−CIE_L*(entry))$^2$+(Yest1 (CIE_a*)−CIE_a*(entry))$^2$+(Yest1(CIE_b*)−CIE_b*(entry))$^2$}. This difference is the Delta E difference between two CIE_Lab color measurements. The method continues by finding the coordinates of a second closest point 200 in the second database 40. In actual practice additional time is saved by computing DeltaE$^2$ instead of DeltaE. This eliminates the step of computing a square root for each data point tested. Find the second closest point 200 as the point with the minimum DeltaE$^2$ to the CIE_Lab estimate 30.

The coordinates of the second closest point 200 are used as a second center 210 of the data points about the color request. If the second closest point 200 is on the edge of the second database 40, then modify the second center 210 to use points just inside the surface. Do this by testing the coordinates against the indexes. Given each colorant, find the maximum number of indexes used in the second database 40. If the coordinate of the second closest point 200 is equal to the first index for this color, then set the coordinate of the second center 210 to the second index. Else if the coordinate for the second closest point 200 is equal to the last index for this color, then set the coordinate of the second center 210 to the last index minus one. Repeat these steps for each color in the second database to obtain the second center 210 of points to be modeled.

The example uses 8 black levels. If the black index for the second closest point is 1, then set the black index for the second center of points to be modeled to 2. If the black index for the closest point was 8, then set the black index for the second center of points to be modeled to 7. Otherwise use the black index for the second closest point as the black index for the second center of points to be modeled.

Next, create a second subset 220 of data points centered about the second center 210 points to be modeled by looking up the coordinates of each point in the second database 40. Each entry consists of CIE_Lab values and colorant input levels. For a database consisting of three colorants, the subset consists of 27 data points, composing a 3×3×3 matrix of points centered about the second center 210 of points to be modeled. The indexes will be (−1, 0, and +1) about the second center 210 point for each of the three colorants.

Next, create a Y2 matrix 230 of colorant settings from the second subset 220 of data points. The second model will generate output colorant settings corresponding to input CIE_Lab values. The Y2 matrix 230 will have one column of 27 black settings, one column of 27 cyan settings, and one column of 27 magenta settings making it a 27-row by 3-column matrix.

Next, create an X2 matrix 240 of measured color from the second subset 220 of data points. The X2 matrix 240 contains one column for each factor used in the second model. As a minimum, model the output colorant settings as a function of CIE_L*, CIE_a*, and CIE_b*. In this example add columns to the X matrix for CIE_L*$^2$, CIE_a*$^2$, CIE_b*$^2$, CIE_L*×CIE_a*, CIE_a*×CIE_b*, CIE_b*×CIE_L*, and a column of ones. This creates an X2 matrix that is 27 rows by 10 columns. Each row corresponds to an entry for one of the 27 rows of the second subset of data points centered about the second center point to be modeled. The modeling process will create slopes for each factor. The modeling process is a general linear model and it is well known in the art. A good reference is in "Applied Regression Analysis", third edition, edited by Norman R. Draper and Harry Smith, 1998.

Next, compute the Beta matrix (B2) 250=(X2' inv(X2)) X2'Y2 where X2 is the X2 matrix 240, X2' is the transpose of the X2 matrix 240, inv(X) is the inverse of the X2 matrix 240, and Y2 is the Y2 matrix 230. The Beta matrix B2 250 will be 10-rows by 3-columns.

Use the Beta matrix (B2) 250 to estimate a Y2 estimate (Yest2 260) by multiplying a new X (X2new 270) by the Beta matrix B2 250. (Yest2=X2new B2) where X2new 270 is a 1 by 10 matrix composed of {CIE_L*new, CIE_a*new, CIE_b*new, CIE_L*new$^2$, CIE_a*new$^2$, CIE_b*new$^2$, CIE_L*new×CIE_a*new, CIE_a*new×CIE_b*new, CIE_b*new×CIE_L*new, and 1}. Y2est 260 will be a 1 by 3 matrix consisting of {colorant 1 setting, colorant 2 setting, and colorant 3 setting}. For example, the Y2est 260 will consist of {black density click, cyan density click, and magenta density click}.

To estimate the colorant levels to obtain an output recipe for the color request compose the X2 matrix (X2new 270) using X2new 270={Y1est(CIE_L*), Y1est(CIE_a*), Y1est(CIE_b*), Y1est(CIE_L*)$^2$, Y1est(CIE_a*)$^2$, Y1est(CIE_b*)$^2$, Y1est(CIE_L*)×Y1est(CIE_a*), Y1est(CIE_a*)×Y1est(CIE_b*), Y1est(CIE_b*)×Y1est(CIE_L*), and 1}. Where Y1est(CIE_L*) is the L* component of the Y1est 160, Y1est (CIE_a*) is the a* component of Y1est, and Y1est(CIE_b*) is the b* component of Y1est 160. Then the colorant levels are in the color estimate matrix, Y2est 160, equal to the X2new 270 matrix multiplied by the Beta matrix B2 250. Y2est 260 will contain {colorant level for color 1, colorant level for color 2, and colorant level for color 3} and Y2est 260 is the new second recipe 50.

After computing the colorant levels for a CIE_Lab color request, it would be nice to know how accurate the printed color will be. To estimate the accuracy first determine if the color is in the second database modeled. Then estimate the model accuracy. Estimate how the printing system will impact the accuracy of the written color. Estimate the affect of rounding the recipe to a least significant colorant level. Lastly, add in the accuracy of the original CIE_Lab estimate or variance of Y1est.

Figure 5:
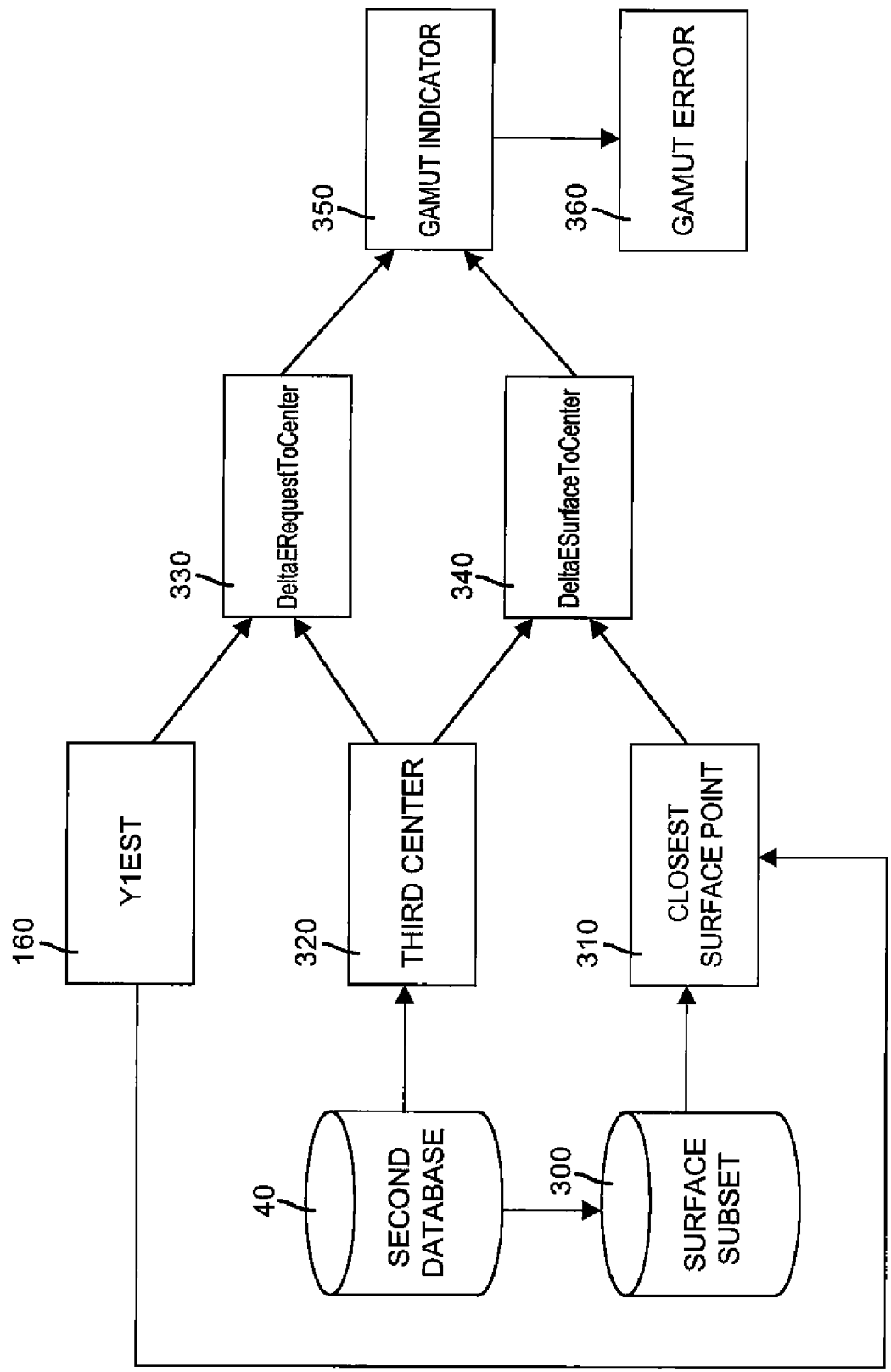
FIG. 5 is a block diagram detailing the method of calculating the gamut error of the second recipe and the second database.

If the color is not included in the second database, then assume that the color is out of gamut for this set of colorants, and increase the error estimate by an amount that indicates how far out of gamut the CIE_Lab request is. To compute this gamut error estimate first find the surface points in the second database 40. Referring to FIG. 5, for each entry in the second database, for each colorant in each entry, if the index of the colorant is equal to 1 or the maximum index for that colorant, then that entry is a surface point and included in the surface subset 300.

For each entry in the surface subset compute the Delta E entry to Y1est 160 as the Delta E between the entry and the CIE_Lab request 30. Define the CIE_Lab of the closest surface point 310 as being that entry with the minimum Delta E Entry to request. Again time is saved by computing DeltaE$^2$ for each surface point and selecting the closest surface point 310 as that point that has the smallest DeltaE$^2$.

Next, find a third center 320 of the second database 40 by finding the minimum and maximum CIE_L*, CIE_a*, and CIE_b* values in the second database. The CIE_L* Center point is calculated using CIE_L* Center=(max(CIE_L*)−min(CIE_L*))/2+min(CIE_L*)=(max(CIE_L*)+min (CIE_L*))/2. Similarly CIE_a* Center=(max(CIE_a*)−min (CIE_a*))/2+min(CIE_a*)=(max(CIE_a*)+min(CIE_a*))/2 and CIE_b* Center=(max(CIE_b*)−min(CIE_b*))/2+min (CIE_b*)=(max(CIE_b*)+min(CIE_b*))/2.

Next, compute the distance between Y1est and the third center 320 (center of the second database), DeltaERequest-ToCenter 330=square root ((Y1est(CIE_L*)−CIE_L*Center)$^2$+(Y1est(CIE_a*)−CIE_a*Center)$^2$+(Y1est (CIE_b*)−CIE_b*Center)$^2$) where Y1est 160 is equal to CIE_Lab estimate 30. Then compute the distance between the closest surface point 310 and the third center 320 (which is the center of the second database), DeltaESurfaceToCenter 340=square root ((CIE_L*Surface−CIE_L*Center)$^2$+ (CIE_a*Surface−CIE_a*Center)$^2$+(CIE_b*Surface−CIE_b*Center)$^2$). Now compute the Gamut Indicator 350=DeltaERequestToCenter 330−DeltaESurfaceToCenter 340. If the gamut indicator 350 is less than zero then the CIE_Lab estimate 160 is inside the second database 40 and the gamut error 360 is set to zero. Otherwise set the gamut error 360 equal to the gamut indicator 350, which is the estimated distance that the CIE_Lab estimate 160 is outside of the second database 40.

Figure 6:
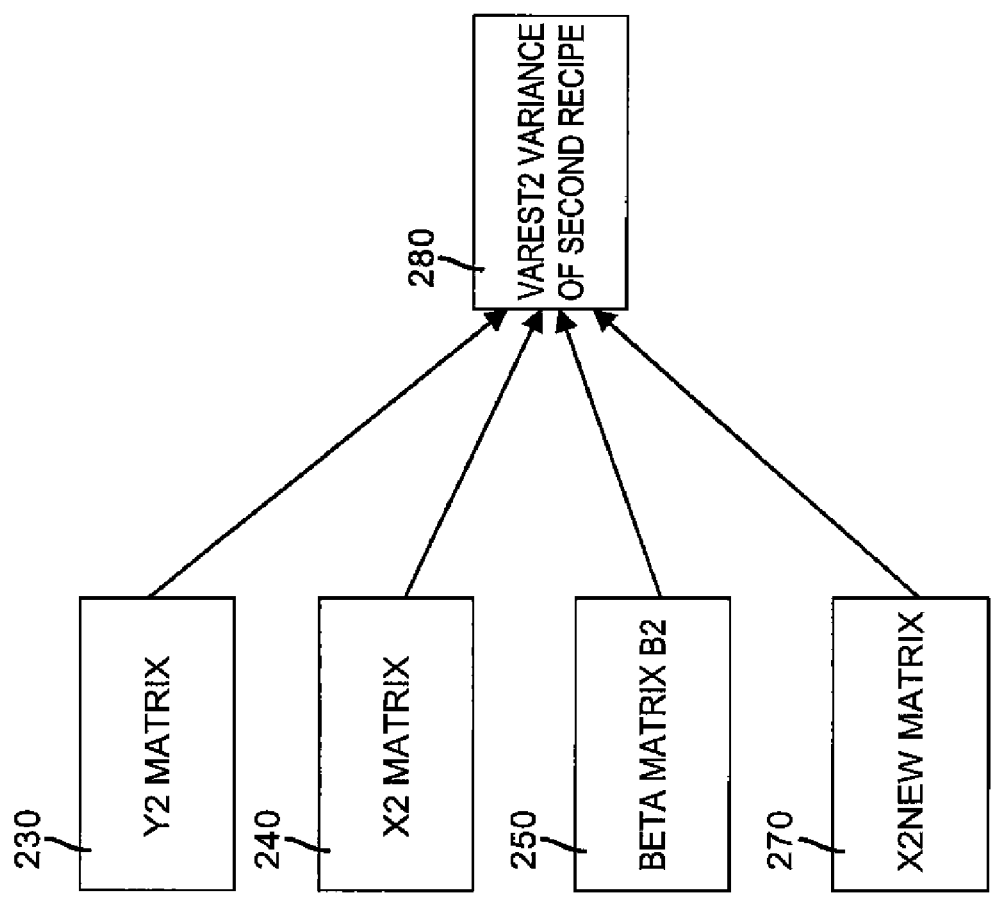
FIG. 6 is a block diagram showing the method of calculating the variance of the estimate for the second recipe.

The next component of the error is the error due to modeling the second database 40. Obtain this error by computing the variance of the estimate for the model as defined by Draper and Smith. Referring to FIG. 6, the variance of the estimate (VarEst2 280) may be computed using VarEst2=X2new (X2' inv(X2)) X2new' MSE2$^2$, where X2new 270 is the X matrix composed of the Y1est 160, X2new' is the transpose of X2new 270, X2 is the X2 matrix 240 of input colorant settings, inv(X2) is the inverse of the X2 matrix 240, and MSE2$^2$ is the variance of the mean squared error for this second model.

Note that X2new (X2' inv(X2)) X2new' will be a 1×1 solution. MSE2$^2$ will be a 3×3 matrix. The terms on the diagonal correspond to the variance of the modeled colorants. Set VarEst2=X2new (X2' inv(X2))X2new' {MSE2$^2$(1,1), MSE2$^2$(2,2), MSE2$^2$(3,3)}.

Compute MSE2$^2$ using MSE2$^2$=(Y2'Y2−B2'X2'Y2)/ dFResidual2 where the a Y2 matrix 230 consists of the measured output colorant settings from the subset of data points, Y2' is the transpose of the Y2 matrix 230, B2 is the Beta matrix B2 250, B2' is the transpose of the Beta matrix B2 250, and dFResidual2 is the degrees of freedom in the residual computed as the total degrees of freedom used to compute the Beta matrix minus the degrees of freedom used in the model. The example has 27 entries have providing 27 total degrees of freedom. The model estimates 10 model terms, so 10 degrees of freedom are used to build the model, leaving 17 degrees of freedom in the residuals. (dFResidual2=17).

The second model produces colorant levels from CIE_Lab request. So the variance of the estimate is in terms of colorant levels. Convert the variability in colorant levels into terms of CIE_Lab color or Delta E by modeling CIE_Lab as a function of colorant levels. Note that the second model produces a Beta matrix that models colorant levels as a function of CIE_Lab. To make this third model use the same second subset 220 of data points centered about the second center 210 points to be modeled.

Figure 7:
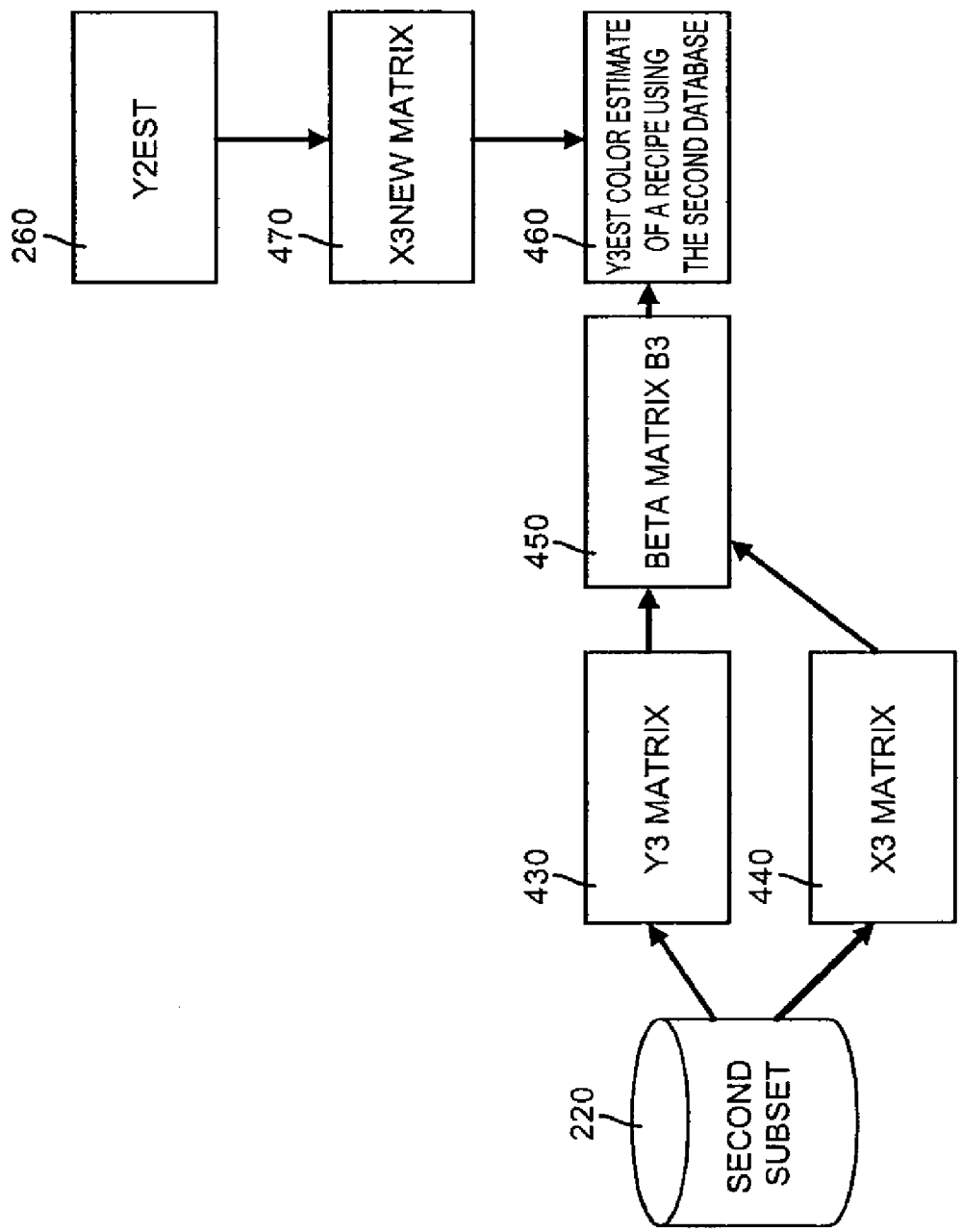
FIG. 7 is a block diagram detailing the calculation of a third model to predict the color of a recipe using the second database.

Referring to FIG. 7, first create a Y3 matrix 430 of measured color from the second subset 220 of data points. The output values from this third model will be CIE_Lab estimate for a given set of colorant settings. The Y3 matrix 430 will have one column of 27 CIE_L* values, one column of 27 CIE_a* values, and one column of 27 CIE_b* values making it a 27 by 3 matrix.

Next create an X3 matrix 440 of colorant settings from the second subset 220 of data points. The X3 matrix 440 contains one column for each factor used in the third model. As a minimum model the output color as a function of colorant1, colorant2, and colorant3. In this description add columns to the X3 matrix for colorant$1^1$, colorant$2^2$, colorant$3^2$, colorant1×colorant2, colorant2×colorant3, colorant3×colorant1, and a column of ones. This creates an X3 matrix that is 27 rows by 10 columns. Each row corresponds to an entry for one of the 27 rows of the second subset of data points centered about the second center point to be modeled. The modeling process will create slopes for each factor.

Next compute the Beta matrix (B3) 450=(X3' inv(X3)) X3' Y3 where X3 is the X3 matrix 440, X3' is the transpose of the X3 matrix 440, inv(X3) is the inverse of the X3 matrix 440, and Y3 is the Y3 matrix 430. The B3 matrix 450 will be 10 by 3.

The Beta matrix B3 450 may be used to estimate a Y3est 460 by multiplying a new X3new 470 by Beta matrix B3 450. (Y3est=X3new B3) where X3new 470 is a 1 by 10 matrix composed of {colorant1, colorant2, colorant3, colorant$1^2$, colorant$2^2$, colorant$3^2$, colorant1×colorant2, colorant2×colorant3, colorant3×colorant1, and 1}. Y3est 460 will be a 1 by 3 matrix consisting of {CIE_L*Estimate, CIE_a*Estimate, and CIE_b*Estimate}.

Use this third model to estimate the error in color due to the second model error. From the second model, Y2est={C1, C2, and C3} given Y1est. Given Y2est compose a new X3 matrix 470 X3(Y2est)={C1, C2, C3, C$1^2$, C$2^2$, C$3^2$, C1×C2, C2×C3, C3×C1, 1}. Compute the estimated color for the estimated colorant levels Y3est 460=X3(Y2est) B3, where B3 is the Beta matrix B3 450.

Next, compute the color for a least significant digit change in each of the colorant levels taken one at a time. Then compute the difference in color for each colorant level taken one at a time. Lastly add up variance components for each colorant difference to generate a color error.

Figure 8:
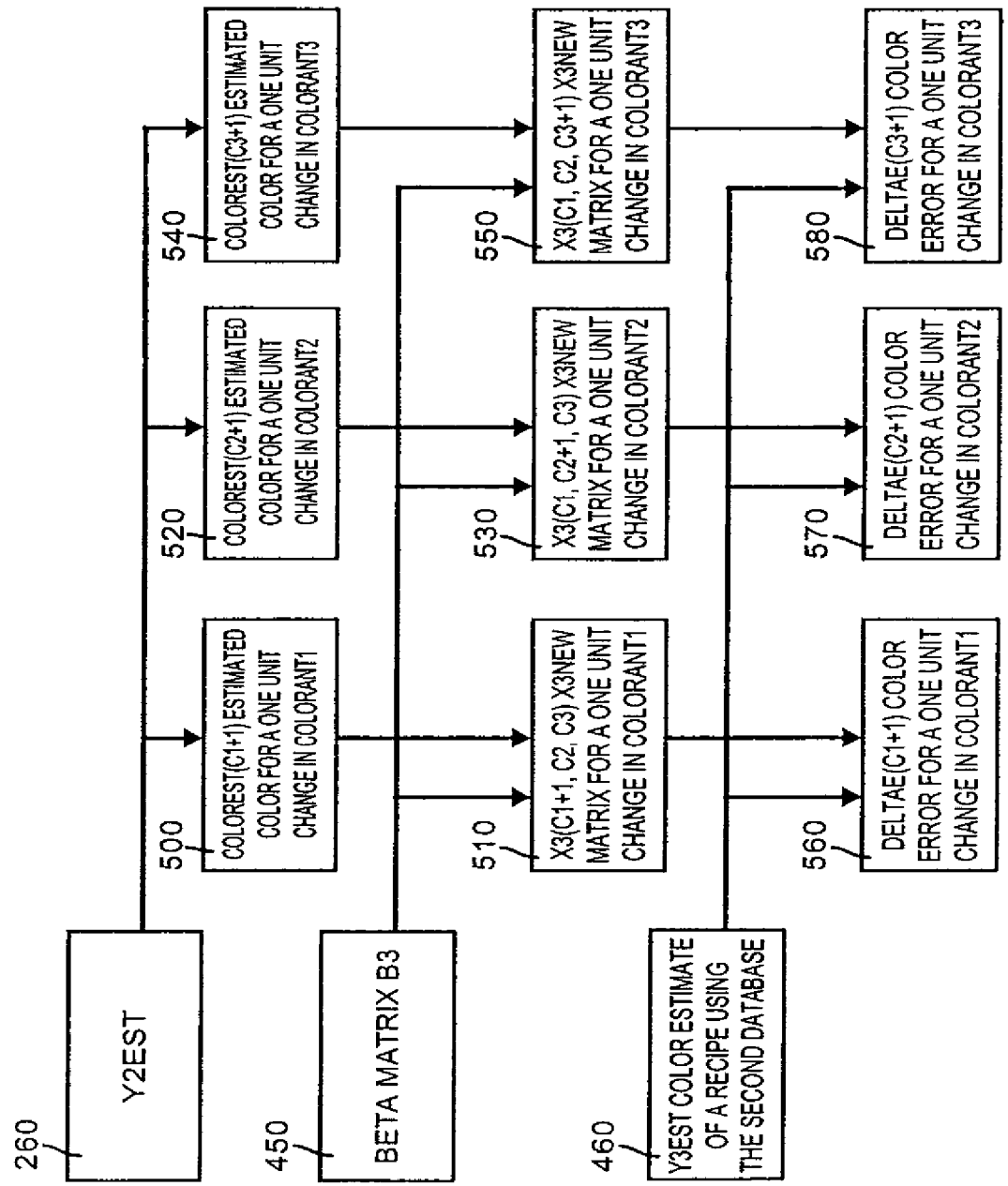
FIG. 8 is a block diagram of the method to calculate the error due to a one unit change in each colorant within the second recipe.

Referring to FIG. 8, the estimated color for a one unit change in colorant 1 is ColorEst(C1+1) 510=X3(C1+1, C2, C3) B3 where C1, C2, and C3 are the colorant levels of the second recipe 50 equal to Y2est 260, X3(C1+1, C2, C3) 500 is an X3new matrix 470 composed of colorant levels C1+1, C2, and C3, and B3 is the Beta matrix B3 450. The color error for a one unit change in colorant1 is DeltaE(C1+1) 560=sqrt{ [CIE_L*(ColorEst(C1+_1))−CIE_L*(ColorEst(Yest)]$^2$+ [CIE_a*(ColorEst(C1+_1))−CIE_a*(ColorEst(Yest)]$^2$+ [CIE_b*(ColorEst(C1+_1))−CIE_b*(ColorEst(Yest)]$^2$} where ColorEst(Yest) is Y3est 460.

The estimated color for a one unit change in colorant 2 is ColorEst(C2+1) 530=X3(C1, C2+1, C3) B3 where C1, C2, and C3 are the colorant levels of the second recipe 50 equal to Y2est 260, X3(C1, C2+1, C3) 520 is an X3new matrix 470 composed of colorant levels C1, C2+1, and C3, and B3 is the Beta matrix B3 450. The color error for a one unit change in colorant2 is DeltaE(C2+1) 570=sqrt{[CIE_L*(ColorEst (C2+_1))−CIE_L*(ColorEst(Yest)]$^2$+[CIE_a*(ColorEst (C2+_1))−CIE_a*(ColorEst(Yest)]$^2$+[CIE_b*(ColorEst (C2+_1))−CIE_b*(ColorEst(Yest)]$^2$} where ColorEst(Yest) is Y3est 460.

The estimated color for a one unit change in colorant 3 is ColorEst(C3+1) 550=X3(C1, C2, C3+1) B3 where C1, C2, and C3 are the colorant levels of the second recipe 50 equal to Y2est 260, X3(C1, C2, C3+1) 540 is an X3new matrix 470 composed of colorant levels C1, C2, and C3+1, and B3 is the Beta matrix B3 450. The color error for a one unit change in colorant3 is DeltaE(C3+1) 580=sqrt {[CIE_L*(ColorEst (C3+_1))−CIE_L*(ColorEst(Yest)]$^2$+[CIE_a*(ColorEst (C3+_1))−CIE_a*(ColorEst(Yest)]$^2$+[CIE_b*(ColorEst (C3+_1))−CIE_b*(ColorEst(Yest)]$^2$} where ColorEst(Yest) is Y3est 460.

Figure 9:
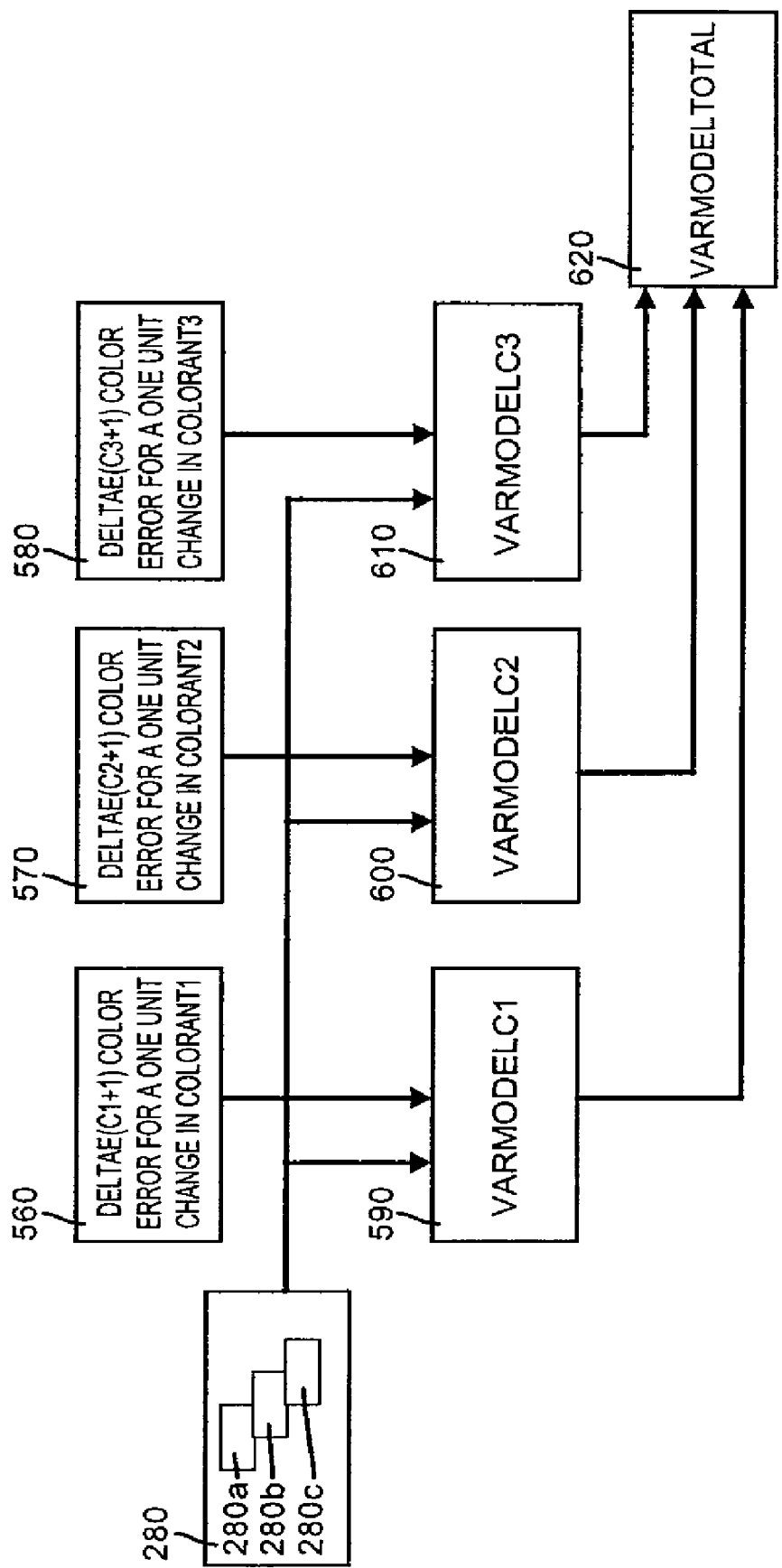
FIG. 9 is a block diagram of the method of calculating the error in the second recipe due to modeling the data in the second database.

FIG. 9 shows the computation of the error in color due to the model. First compute the model variances. The model variance due to the first colorant, VarModelC1 590=VarEst2 (1) 280$a$×[DeltaE(C1+1) 560]$^2$. The model variance due to the second colorant, VarModelC2 600=VarEst2(2) 280$b$× [DeltaE (C2+1) 570]$^2$. The model variance due to the third colorant, VarModelC3 610=VarEst2(3) 280$c$×[DeltaE (C3+ 1) 580]2. The total model variance=the sum of the variances=VarModelTotal 620=VarModelC1+VarModelC2+ VarModelC3. The expected variability due to the model in terms of Delta E is the square root of VarModelTotal.

Figure 10:
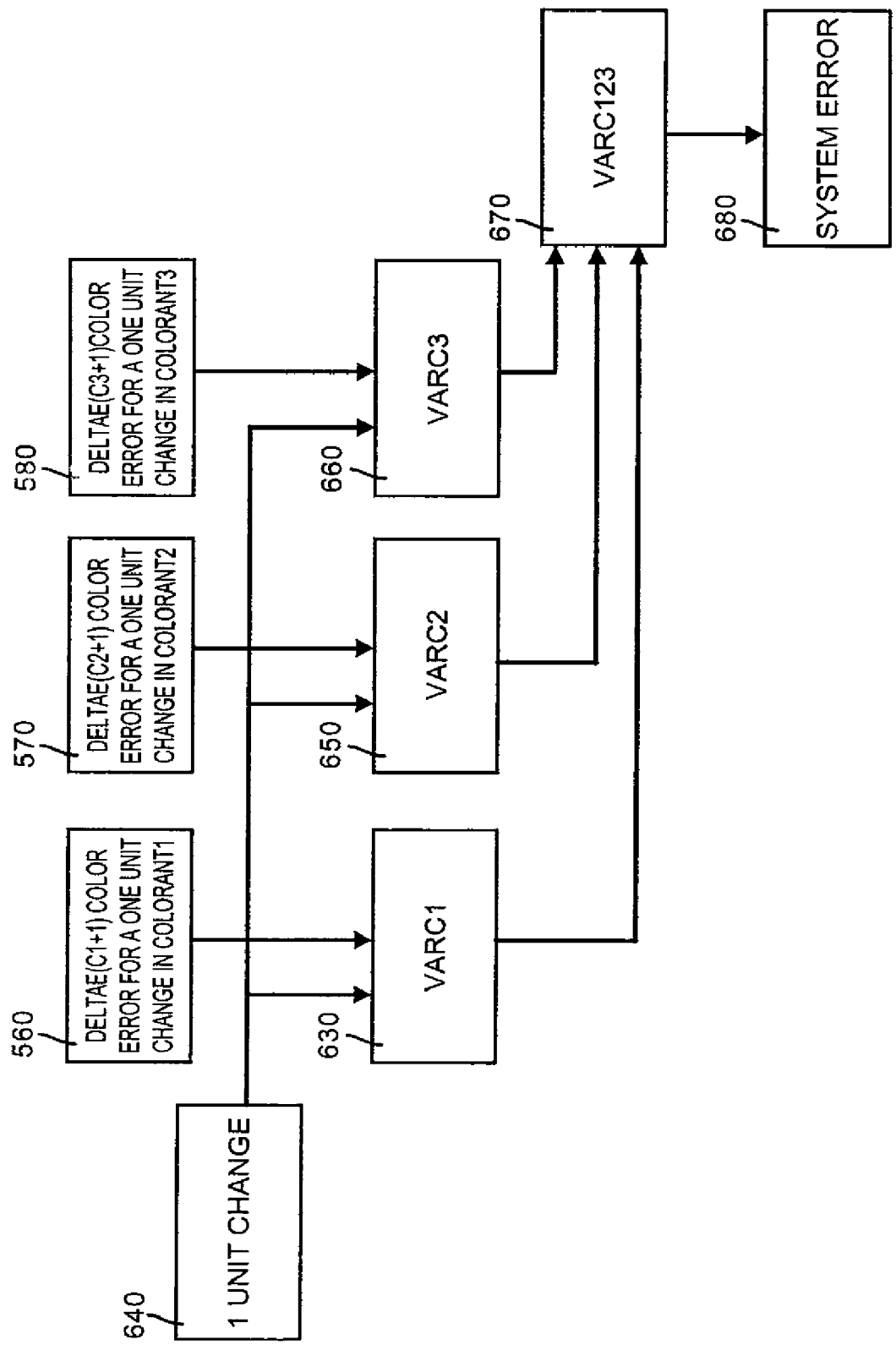
FIG. 10 is a block diagram of the method of calculating the error in a system with an accuracy level of 1 unit change on each colorant.

The present invention may also compute the variability due to a one unit change in each of the colorants by computing their variances as shown in FIG. 10. The variance due to a one unit change in the first colorant is VarC1 630=(1 unit change 640)$^2$×[DeltaE(C1+1) 560]$^2$. The variance due to a one unit change in the second colorant is VarC2 650=(1 unit change 640)$^2$×[DeltaE(C2+1) 570]$^2$. The variance due to a one unit change in the third colorant is VarC3 660=(1 unit change 640)$^2$×[DeltaE(C3+1) 580]$^2$. The total variance due to a one unit change is VarC123 670=VarC1 630+VarC2 650+VarC3 660. The expected variability due to a one unit change in each colorant level is the system error 680, assuming that the system is accurate to ±1 unit in each color. This system error 680 is equal to the square root of VarC123 670 in terms of Delta E.

Note this estimate may be modified for systems that are better or worse at holding output density to within one unit per colorant. Also note that this estimate may be based on the colorant settings if the accuracy of the printing system depended upon the colorant settings.

Figure 11:
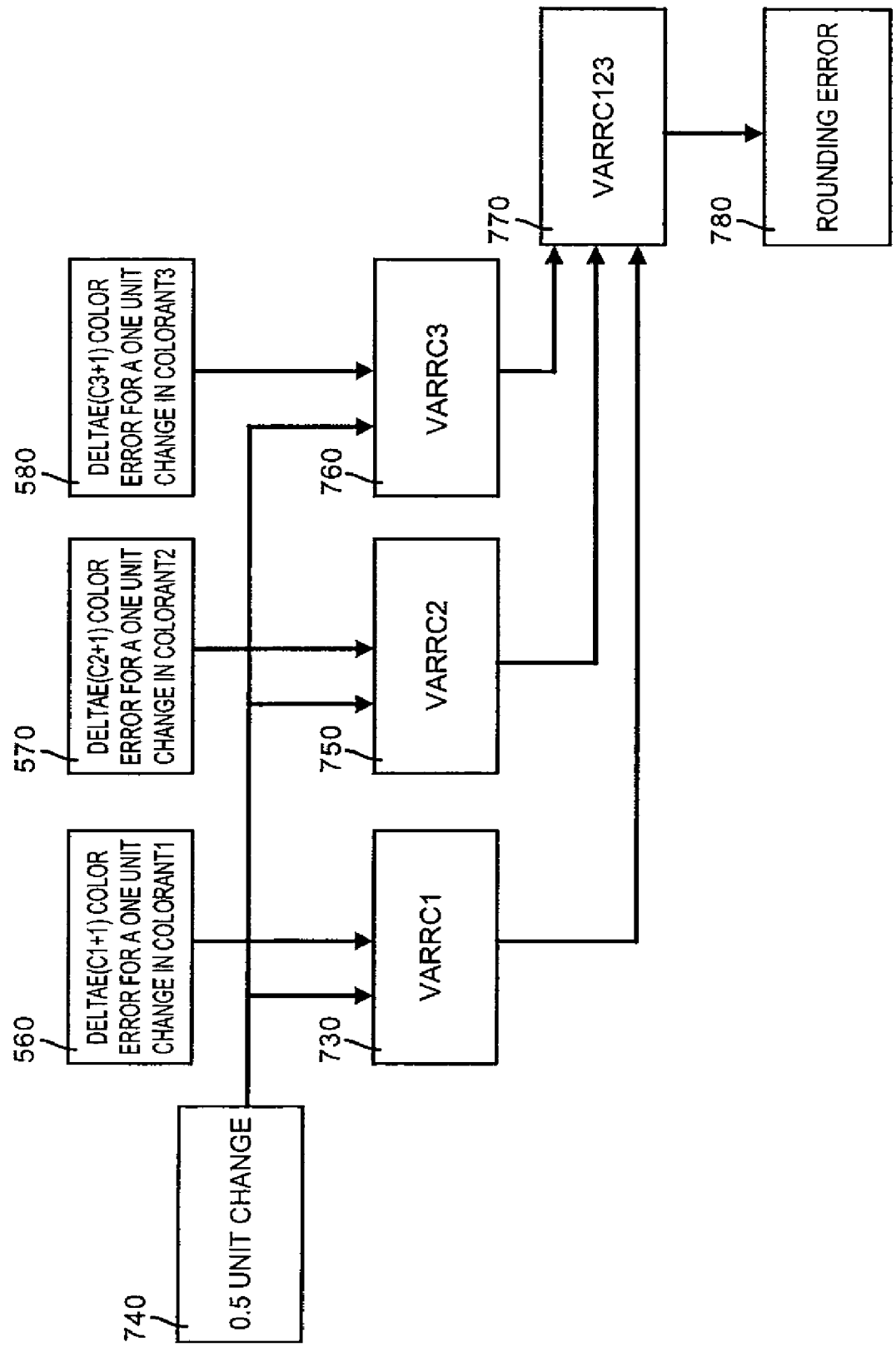
FIG. 11 is a block diagram of the method of calculating the error in the second recipe due to rounding the recipe to a lease significant value of 1 unit on each of the three colorants.

An error due to rounding the colorant settings to the nearest unit may be computed as in FIG. 11. The variance due to rounding in the first colorant is VarRC1 730=(0.5 unit change 740)$^2$×[DeltaE(C1+1) 560]$^2$. The variance due to rounding in the second colorant is VarRC2 750=(0.5 unit change 740)$^2$× [DeltaE(C2+1) 570]$^2$. The variance due to rounding in the third colorant is VarRC3 760=(0.5 unit change 740)$^2$×[DeltaE (C3+1) 580]$^2$. The total variance due to rounding is VarRC123 770=VarRC1 730+VarRC2 750+VarRC3 760. The expected variability due to rounding each colorant level is the rounding error 780. This rounding error 780 is equal to the square root of VarRC123 770 in terms of Delta E.

Figure 12:
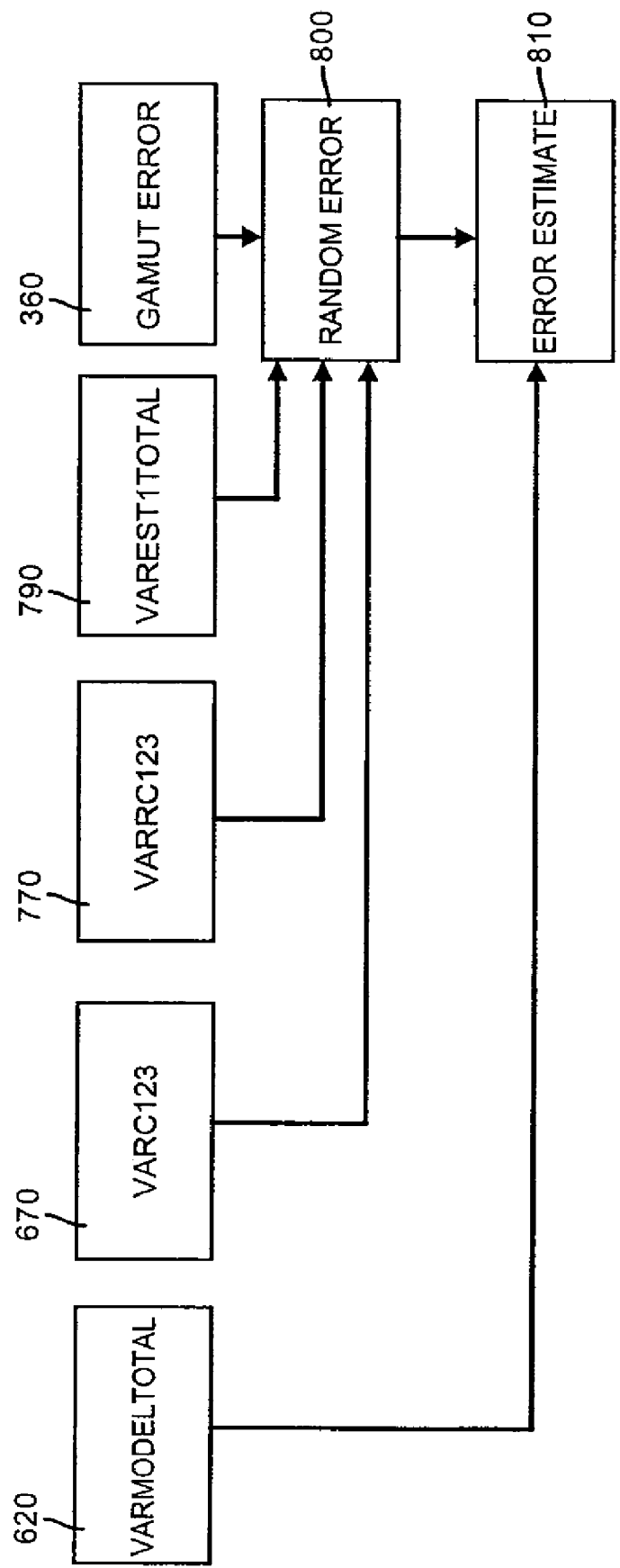
FIG. 12 is a block diagram depicting the calculation of the error estimate for the second recipe.

FIG. 12 shows a total accuracy equal to the gamut error plus or minus the errors due to the model, errors due to the system, and errors due to rounding. The model, system, and rounding errors may be considered random and noncorrelated relative to each other. Therefore estimate the total error by using the square root of the sum of their variances. The gamut error is in addition to the random errors, as the CIE_Lab request is outside the gamut of the database and there is no means to achieve the desired color. The random errors will be centered about the gamut error. If the CIE_Lab request is within the database the gamut error will be zero. The stated accuracy of the output color is the gamut error ± the random error 800 where the random error 800=the square root of the sum of (VarModelTotal 620+VarC123 670+VarRC123 770).

The accuracy estimate may also include the accuracy of converting the original first recipe using the first donor set to CIE_Lab by adding to the random error 800 an amount equal to VarEst1 Total 790=VarEst1(1)$^2$+VarEst1(2)$^2$+VarEst1(3)$^2$. This makes the error estimate 810 equal to gamut error 620 ±square root of {VarModelTotal 620+VarC123 670+VarRC123 770+VarEst1Total 790}.

In this example, a database is disclosed consisting of black, cyan, and magenta colorants. The first recipe may be in terms of other colorants. Additional database pages may be added to the first database for each color combination of interest. For instance add another page to the first database using the colorants black, magenta, and yellow. A Kodak Approval Digital Color Proofing System may be used to image Magenta DM02, Yellow DY01, and Black DK02 donors. Color patches were imaged using nine magenta density clicks from D-52 in steps of 10, nine yellow density clicks from D-59 in steps of 11, and eight black density clicks of {−61, −52, −42, −32, −20, −8, 6, and 30}. On the Kodak Approval Digital Color Proofing System a Yellow DY01 density click is converted to Status T Density by the formula Density Click*0.0125+0.73+Yellow Density of Paper. The color patches were read using a Gretagmacbeth Spectroscan/Spectrolino. The additional page was processed using the same method as the page in the original first database to create a CIE_Lab Estimate for given black, magenta, and yellow colorant settings.

A Kodak Approval Digital Color Proofing System was also used to image Magenta DM03, Yellow DY03, and Black DK03 donors. Patches were imaged using nine magenta density clicks from D-52 in steps of 10, nine yellow density clicks from D-77 in steps of 13, and eight black density clicks of {−61, −52, −42, −32, −20, −8, 6, and 30}. On the Kodak Approval Digital Color Proofing System a Yellow DY03 density click is converted to Status T Density by the formula Density Click*0.0125+0.95+Yellow Density of Paper. The color patches were read using a Gretagmacbeth Spectroscan/Spectrolino. This page was added to the second database and processed using the same method as the original page in the original second database to create a CIE_Lab Estimate for given CIE_Lab estimate created from a first black, magenta, and yellow recipe using a first donor set.

An expanded first database was created using the pages of donors; {Black DK02, Cyan DC02, and Magenta DM02}, {Black DK02, Magenta DM02, and Yellow DY01}, {Black DK02, Cyan DC02, and Yellow DY01}, {Cyan DC02, Magenta DM02, Yellow DY01}, {Black DK02, Magenta DM02, Orange DO01}, {Black DK02, Yellow DY01, Orange DO01}, {Black DK02, Yellow DY01, Green DG01}, {Black DK02, Cyan DC02, Green DG01}, {Black DK02, Cyan DC02, Blue DB01}, {Black DK02, Magenta DM02, Blue DB01}, and {Cyan DC02, Magenta DM02, Blue DB01}.

An expanded second database was created using pages of donors; {Black DK03, Cyan DC03, and Magenta DM03}, {Black DK03, Magenta DM03, and Yellow DY03}, {Black DK03, Cyan DC03, and Yellow DY03}, {Cyan DC03, Magenta DM03, Yellow DY03}, {Black DK03, Magenta DM03, Orange DO01}, {Black DK03, Yellow DY03, Orange DO01}, {Black DK03, Yellow DY03, Green DG01}, {Black DK03, Cyan DC03, Green DG01}, {Black DK03, Cyan DC03, Blue DB01}, {Black DK03, Magenta DM03, Blue DB01}, and {Cyan DC03, Magenta DM03, Blue DB01}.

For each page in the first database, given a first Recipe, a CIE_Lab estimate may be calculated. Then the corresponding page in the second database may be used to calculate a second recipe. Alternatively calculate the CIE_Lab Estimate from the first Recipe with the corresponding page in the expanded first database. Then calculate recipes using each page in the expanded second database. Then use the gamut error and the random error to sort the solutions and select the best one.

In the example, equally spaced increments of the cyan and magenta colorant input levels were used. It is understood that nonlinear increments may be used as shown in black. Or linear increments may be used in all three colorants.

In the example an 8×9×9 array of black, cyan, and magenta, with data from paper to the maximum density settings of the printer was used. It is understood that database pages may be created to model data only near neutrals, or some other color target such as process Red on a printing press.

The invention may be used with different colorants from different colorant sets such as Kodak Approval Cyan DC03, Cyan DC04, Cyan DC05, Magenta DM01, Magenta DM03, Magenta DM04, Yellow DY02, Yellow DY03, Yellow DY04, and Black DK03. The invention may be used to compare one colorant set to another by ranking the resulting output colorants according to the sum of Gamut Error$^2$ and Random Error$^2$.

The invention has been used to automatically return one solution from multiple pages in the second database to convert sets of first recipes into second recipes. The invention may be limited to only use colors in the original recipe, or to check across pages of different colors for a better match. The invention has also been used to determine if additional colorants such as orange, green, and blue, provide a better solution. To determine which color page in the second database provides a better solution the output recipes were ranked using the sum of Gamut Error$^2$ and Random Error$^2$.

The invention has also been used to convert a recipe from a first database to multiple recipes from a second database. For instance a blue recipe may be composed of set of colorants {cyan, magenta, and black}, {cyan, blue, and black}, and {cyan, magenta, and yellow}. In this use the invention has been used to return multiple recipes in a sorted order based on a ranking computed using the sum of Gamut Error$^2$ and Random Error$^2$.

The example did not include a four color page of data in the first database. However it would be easy for one skilled in the art to include a page consisting of cyan, magenta, yellow, and black. Then model CIE_Lab as a function of these four colors and estimate the CIE_Lab for a given four color recipe. The CIE_Lab estimate may then be converted into a three color recipe by estimating the recipe, gamut error, and random error for each page in the expanded second database. Sorting the solutions using the sum of Gamut Error$^2$+Random Error$^2$. Selecting the recipe with the minimum sum square error. It would be easy for one skilled in the art to perform this method using any set of four colors in the first database.

While the example disclosed used databases imaged on a Kodak Approval Digital Proofing System, it is understood that recipes may be created with the invention for other colorant systems. For instance databases may be created using different concentrations of three colors of ink to model an inkjet printing system. The invention may be used to convert a recipe from a set of one inks to another.

A database may be created using a binary proofing system using three colorants screened with a halftone screen at a halftone screen rulings and angles with different percent tint levels. Or a database may be created using a binary proofing system with three colorants screened using a stochastic screen at different percent tint levels. The invention may be used to model solid colors, screened colors, or colors composed using any type of modulation pattern. The invention may be used to convert a recipe from one screening system to another.

The invention may be used to convert a recipe from a screened system to a continuous system or from a continuous system to a screened system. The first database may be from a screened system, while the second database may be from a continuous device such as a silver halide print.

A database may be created using paint with colorants composed of different levels of three primary pigments. The invention may be used to convert a recipe from one set of pigments to another.

In all of the cases cited the invention may be used to select the best recipe from different sets of colorants or, different types of primary colorants. The invention may also be used to select recipes from sets of primary colorants that are substantially the same color yet different from each other.

The invention has been described in detail with particular reference to certain preferred embodiments thereof, but it will be understood that variations and modifications can be effected within the scope of the invention.

PARTS LIST 10 first recipe
20 first database
30 CIE_Lab estimate
40 second database
50 second recipe
100 closest point
110 center point
120 first subset
130 Y1 matrix
140 X1 matrix
150 Beta matrix B1
160 Y1est
170 Y1new matrix
180 VarEst1 variance of CIE_Lab estimate
200 second closest point
210 second center
220 second subset
230 Y2 matrix
240 X2 matrix
250 Beta matrix B2
260 Y2est
270 X2new matrix
280 VarEst2 Variance of second recipe
280a VarEst2(1)
280b VarEst2(2)
280c VarEst2(3)
300 surface subset
310 closest surface point
320 third center
330 DeltaERequestToCenter
340 DeltaESurfaceToCenter
350 gamut indicator
360 gamut error
430 Y3 matrix
440 X3 matrix
450 Beta matrix B3
460 Y3est color estimate of a recipe using the second database
470 X3new matrix
500 ColorEst(C1+1) estimated color for a one unit change in colorant1
510 X3(C1+1, C2, C3) X3New matrix for a one unit change in colorant1
520 ColorEst(C2+1) estimated color for a one unit change in colorant2
530 X3(C1, C2+1, C3) X3New matrix for a one unit change in colorant2
540 ColorEst(C3+1) estimated color for a one unit change in colorant3
550 X3(C1, C2, C3+1) X3New matrix for a one unit change in colorant3
560 DeltaE(C1+1) color error for a one unit change in colorant1
570 DeltaE(C2+1) color error for a one unit change in colorant2
580 DeltaE(C3+1) color error for a one unit change in colorant3
590 VarModelC1
600 VarModelC2
610 VarModelC3
620 VarModelTotal
630 VarC1
640 1 unit change
650 VarC2
660 VarC3
670 VarC123
680 system error
730 VarRC1
740 0.5 unit change
750 VarRC2
760 VarRC3
770 VarRC123
780 rounding error
790 VarEst1Total
800 random error
810 error estimate

The invention claimed is:

1. A method of converting a first recipe using a first colorant set to a second recipe using a second colorant set in a digital color proofer system wherein a recipe is a data file defining a color and including at least a set of colorant values of a colorant set, comprising the steps of:

converting the first recipe into a CIE_Lab (Commission Internationale de l'Éclairage L*a*b*) estimate for the digital color proofer system using a first model and a first database comprising at least one page defined as an array of data points containing at least one first recipe;

converting the CIE_Lab estimate into the second recipe in the digital color proofer system using a second model and a second database wherein the second database comprises at least one page defined as a second array of data points with a determined center of the second array and surface points from the second database wherein at least one second recipe corresponds to the first recipe;

calculating an accuracy estimate for the at least one second recipe in the second database, the accuracy estimate including the steps of;

computing a gamut error representing a difference between a first color represented by a first recipe of the first set of colorants and the center of the at least one second array of data points and the value of the difference from the center of the at least one second array to the closest of the surface points of the second array; and computing a random error including at least one of the steps of;
   determining a model error in conversions of a first recipe to a CIE_Lab representation,
   determining a second model error in conversion of a CIE Lab estimate to the second recipe,
   obtaining a system error in the color conversion process, and
   rounding errors in settings of colorant values,
selecting a second recipe having a maximum accuracy estimate from the at least one second recipe in the second database; and
providing the second recipe and the accuracy estimate to a user and storing the second recipe and the accuracy estimate.

2. The method of claim 1 wherein the first database comprises pages comprised of first, second, and third colorants.

3. The method of claim 1 wherein the second database comprises pages comprised of fourth, fifth, and sixth colorants.

4. The method of claim 1 wherein the first database comprises pages comprised of first, second, and third colorants;
   the second database comprises pages comprised of fourth, fifth, and sixth colorants;
   the fourth colorant is the same color as the first colorant;
   the fifth colorant is the same color as the second colorant; and
   the sixth colorant is the same color as the third colorant.

5. The method of claim 1 wherein at least one page in the first database contains four colorants.

6. The method of claim 2 wherein the pages in the first database comprise at least one set selected from a group consisting of: {Cyan, Magenta, and Black}, {Cyan, Yellow, and Black}, {Magenta, Yellow, and Black}, {Cyan, Magenta, and Yellow}, {Cyan, Blue, and Black}, {Cyan, Green, and Black}, {Magenta, Blue, and Black}, {Magenta, Orange, and Black}, {Yellow, Orange, and Black}, {Yellow, Green, and Black}, {Cyan, Magenta, and Blue}, {Magenta, Yellow, and Orange}, or {Yellow, Green, and Cyan}.

7. The method of claim 3 wherein the pages in the first database comprise at least one set selected from a group consisting of: {Cyan, Magenta, and Black}, {Cyan, Yellow, and Black}, {Magenta, Yellow, and Black}, {Cyan, Magenta, and Yellow}, {Cyan, Blue, and Black}, {Cyan, Green, and Black}, {Magenta, Blue, and Black}, {Magenta, Orange, and Black}, {Yellow, Orange, and Black}, {Yellow, Green, and Black}, {Cyan, Magenta, and Blue}, {Magenta, Yellow, and Orange}, or {Yellow, Green, and Cyan}.

8. The method of claim 1 wherein the first model is based on a subset of data in said first database.

9. The method of claim 1 wherein the first model is based on a subset of data in said first database wherein a subset contains a center data point defined as a point with a smallest distance between a density click settings in the first recipe and a density click settings for each data point in the first database.

10. The method of claim 9 wherein the subset is a 3×3×3 array of data points.

11. The method of claim 10 wherein center point of said subset is either the closest data point or next to the closest data point.

12. A method of converting a first recipe using a first donor set to a second recipe using a second donor set in a digital color proofer system wherein a recipe is a data file defining a color and including at least a set of colorant values of a colorant set, comprising:
   converting the first recipe into a CIE_Lab (Commission Internationale de l'Éclairage L*a*b*) estimate for the digital color proofer system using a first model and a first database comprising at least one page defined as an array of data points containing at least one first recipe;
   converting the CIE_Lab estimate into a set of second recipes in the digital color proofer system using a model from each page in a second database comprising at least one page defined as a second array of data points with a determined center and surface points for each second array of data points containing at least one second recipe;
   computing a gamut error and a random error for each second recipe from each page in said second database, wherein the gamut error is the difference of the first recipe and the center and the value of the center to the closest surface point;
   selecting a second recipe with a minimum sum of gamut error squared plus random error squared; and
   providing the second recipe to a user and storing the second recipe.

13. The method of claim 12 wherein each random error includes a variance component for an error in estimating the CIE_Lab value of the first recipe.

14. The method of claim 12 wherein the random error for each of the second recipes includes a variance component for the model.

15. The method of claim 12 wherein the random error for each second recipe includes a variance component for an error in the accuracy of reproducing the recipe.

16. The method of claim 12 wherein the random error for each second recipe includes a variance component for an error due to rounding.

17. A method of converting a first recipe using a first colorant set to a second recipe using a second colorant set in a digital color proofing system comprising:
   printing a first set of color patches from a first subset of a first set of donors with a first set of recipes;
   measuring first CIE_Lab (Commission Internationale de l'Éclairage L*a*b*) values from the first set of color patches;
   creating a first file containing the first CIE_Lab values and the first set of recipes for the digital color proofer system;
   printing a second set of color patches from a first subset of a second set of donors with a second set of recipes;
   measuring second CIE_Lab values from the second set of color patches;
   creating a second file in the digital color proofer system containing the second CIE_Lab values and the second set of recipes;
   creating a first model from a first recipe, the first CIE_Lab values, and the first set of recipes, from the first file;
   calculate a CIE_Lab estimate from the first model and the first recipe;
   creating a second model from the CIE_Lab estimate, the second CIE_Lab values, and the second set of recipes each second recipe having a determined center and surface points, from the second file;
   creating a second recipe from the second model in the CIE_Lab estimate;
   computing a first gamut error and a first random error for the second recipe using the first and second models wherein the gamut error is the difference between the value of the first recipe and the center from the second file and the value of the center and the nearest surface point; and
   presenting the second recipe to a user or storing the second recipe.

18. The method of claim 17 comprising:

printing a third set of color patches from a second subset of the second set of donors with a third set of recipes;

measuring third CIE_Lab values from the third set of color patches;

creating a third file containing the third CIE_Lab values and the third set of recipes each third recipe having a determined center and surface points;

creating a third model from the CIE_Lab estimate, the third CIE_Lab values, and the third set of recipes, from the third file;

creating a third recipe from the third model in the CIE_Lab estimate;

computing a second gamut error and a second random error for the third recipe using the first and third models, wherein the gamut error is the difference between the value of the first recipe and the center of the third file and the value of the center of the third file and the nearest surface point; and presenting the second recipe to a user or storing the second recipe.

19. The method of claim 18 comprising:

choosing the best recipe from the second recipe and the third recipe.

20. The method of claim 18 comprising:

calculating a first sum comprised of the square of the first gamut error and the square of the first random error;

calculating a second sum comprised of the square of the second gamut error and the square of the second random error; and if the first sum is smaller than the second sum select the second recipe, if not select the third recipe.

* * * * *